(12) United States Patent
Hsu et al.

(10) Patent No.: US 7,157,846 B2
(45) Date of Patent: Jan. 2, 2007

(54) BLINK PLASMA BACKLIGHT SYSTEM FOR LIQUID CRYSTAL DISPLAY

(75) Inventors: Horng-Bin Hsu, Taipei (TW); Chung-Kuang Tsai, Jhudong Township, Hsinchu County (TW)

(73) Assignee: AU Optronics Corporation (TW)

( * ) Notice: Subject to any disclaimer, the term of this patent is extended or adjusted under 35 U.S.C. 154(b) by 148 days.

(21) Appl. No.: 10/458,662

(22) Filed: Jun. 10, 2003

(65) Prior Publication Data

US 2004/0251808 A1  Dec. 16, 2004

(51) Int. Cl.
*H01J 1/62* (2006.01)
*H01J 17/49* (2006.01)

(52) U.S. Cl. .................. 313/494; 313/491; 313/485; 313/582

(58) Field of Classification Search .............. 313/5, 313/485, 491, 494, 518–519, 635, 582, 493; 345/60; 315/169.4
See application file for complete search history.

(56) References Cited

U.S. PATENT DOCUMENTS

| | | | | |
|---|---|---|---|---|
| 4,728,864 A | * | 3/1988 | Dick | 315/169.3 |
| 5,852,347 A | * | 12/1998 | Marcotte | 315/169.4 |
| 5,982,090 A | * | 11/1999 | Kalmanash | 313/493 |
| 5,998,935 A | * | 12/1999 | Marcotte | 315/169.4 |
| 6,034,470 A | * | 3/2000 | Vollkommer et al. | 313/485 |
| 6,255,782 B1 | * | 7/2001 | Kuroda et al. | 315/169.1 |
| 6,550,934 B1 | | 4/2003 | Tao et al. | |
| 6,563,266 B1 | * | 5/2003 | Ok et al. | 313/582 |
| 2003/0122771 A1 | | 7/2003 | Ken et al. | |
| 2003/0146699 A1 | | 8/2003 | Lee | |

FOREIGN PATENT DOCUMENTS

| | | |
|---|---|---|
| JP | 2004-104004 | 9/1917 |
| JP | 01-292738 | 11/1989 |
| JP | 01292738 | 11/1989 |
| JP | 05-019253 | 1/1993 |
| JP | 05019253 | 1/1993 |
| JP | 09-027298 | 1/1997 |
| JP | 09027298 | 1/1997 |
| JP | 2002-042731 | 2/2002 |
| JP | 2003-131224 | 5/2003 |
| JP | 2003131224 | 5/2003 |
| JP | 2003-203608 | 7/2003 |
| TW | (02)23767341 | 9/2005 |

* cited by examiner

*Primary Examiner*—Karabi Guharay
(74) *Attorney, Agent, or Firm*—Duane Morris LLP

(57) ABSTRACT

A blink plasma backlight system for a liquid crystal display comprises a first substrate; a second substrate arranged substantially in parallel with and spaced-apart from the first substrate, forming a gas discharge space therebetween; at least one electrode pair disposed on an inner surface of the second substrate, the electrode pair containing a first electrode and a second electrode approximately parallel to each other; a control unit coupled to the electrode pair, for periodically providing an energy to ignite a gas discharge between the first and second substrates; a dielectric layer disposed on the inner surface of the second substrate covering the electrode pairs; and a first fluorescent layer disposed on the inner surface of the first substrate.

16 Claims, 7 Drawing Sheets

BLINK PLASMA BACKLIGHT SYSTEM FOR LIQUID CRYSTAL DISPLAY

FIELD OF THE INVENTION

The present invention relates to liquid crystal displays (LCDs), and more particularly to a blink plasma backlight system for LCDs.

BACKGROUND

Liquid crystal displays (LCDs) contains a plurality of picture elements, or pixels, formed by liquid crystal cells that change the polarization direction of light in response to an electrical voltage. By controlling a voltage applied to a liquid crystal cell, the intensity of light coming out of the LCDs changes. Among various driving methods, active matrix liquid crystal displays, which have a switching element such as a thin film transistor for each of the pixels so as to control a voltage to be applied to the liquid crystal, are superior in display quality and have been intensively developed and come to be widely used.

In addition to a panel having upper and lower glass substrates with a liquid crystal layer interposed therebetween to control the intensity of light coming out of LCDs, LCDs must first have a backlight unit arranged under the liquid crystal display panel to furnish visible lights. The backlight is traditionally generated by cold cathode fluorescent lamps (CCFLs). A blink backlight using CCFLs has been proposed to improve the display quality of moving pictures.

However, the blinking operation of CCFLs causes more than 10% luminance lost depending on the number of CCFLs employed. In addition, CCFLs have long response time of about 5 ms which becomes an obstacle for improving the display quality of moving pictures. Moreover, it is more difficult to manage the intersection problem caused by overlap of lights emitted from adjacent CCFL tubes. It is also more costly to use CCFLs because each CCFL needs an individual inverter to function normally.

SUMMARY OF THE INVENTION

A blink plasma backlight system for a liquid crystal display comprises a first substrate; a second substrate arranged substantially in parallel with and spaced-apart from the first substrate, forming a gas discharge space therebetween; at least one electrode pair disposed on an inner surface of the second substrate, the electrode pair containing a first electrode and a second electrode approximately parallel to each other; a control unit coupled to the electrode pair, for periodically providing an energy to ignite a gas discharge between the first and second substrates; a dielectric layer disposed on the inner surface of the second substrate covering the electrode pairs; and a first fluorescent layer disposed on the inner surface of the first substrate.

BRIEF DESCRIPTION OF THE DRAWINGS

A more complete understanding of the present invention can be obtained by reference to the detailed description of embodiments in conjunction with the accompanying drawings, in which.

DETAILED DESCRIPTION

This description of the exemplary embodiments is intended to be read in connection with the accompanying drawings, which are to be considered part of the entire written description. In the description, terms concerning connections, such as "coupled to" and "connected to," refer to a relationship wherein signals and/or energies can transfer from one component to another either directly or indirectly, unless expressly described otherwise.

Figure 1:
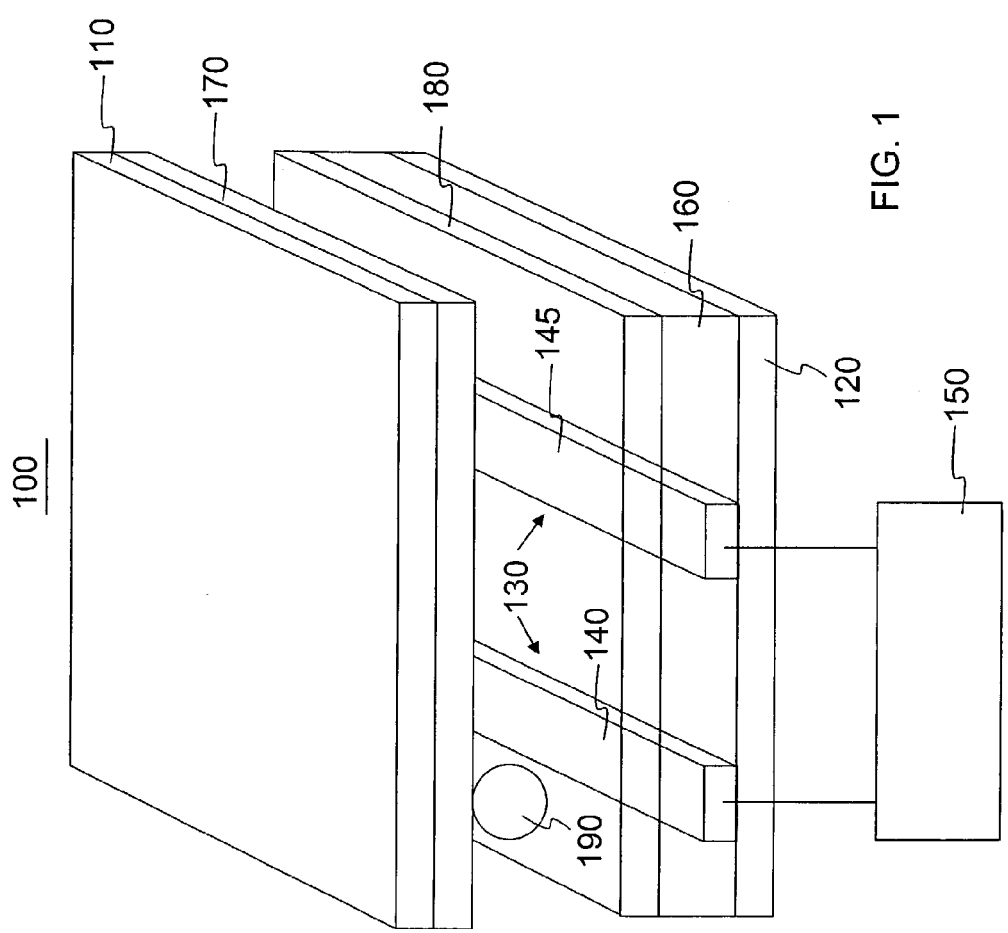
FIG. 1 illustrates an oblique plan view of a blink plasma backlight system.

As shown in FIG. 1, an exemplary embodiment of a blink plasma backlight system 100 for liquid crystal displays comprises a first substrate 110; a second substrate 120, at least one electrode pair 130 disposed on an inner surface of the second substrate 120, a control unit 150 coupled to the electrode pair 130, a dielectric layer 160 disposed on the inner surface of the second substrate 120 covering the electrode pair 130, and a fluorescent layer 170 disposed on the inner surface of the first substrate 110. The second substrate 120 is arranged substantially in parallel with and spaced-apart from the first substrate 110 to form a gas discharge space therebetween. The electrode pair 130 contains a first electrode 140 and a second electrode 145 approximately parallel to each other. The control unit 150 provides appropriate energy to ignite a gas discharge between the first substrate 110 and the second substrate 120, for example by periodically providing sustain pulses.

The first substrate 110 and the second substrate 120 comprise glass or plastic. The shape and size of the first substrate 110 and the second substrate 120 are related to LCD for which a blink plasma backlight system is used. In one embodiment of 17-inch LCD, the first substrate 110 and the second substrate 120 are rectangular with length of about 36 cm and width of about 27 cm. The distance between the first substrate 110 and the second substrate 120 ranges from about 1 mm to about 5 mm. In some embodiments, at least one spacer 190 is disposed between the first substrate 110 and the second substrate 120 to maintain the distance. The spacer 190 comprises glass or plastic. In other embodiments, a barrier rib can be used to separate the first substrate 110 from the second substrate 120. Gas such as xenon, neon-xenon mixture, helium-xenon mixture, and argon-xenon mixture is filled in the space between the first substrate 110 and the second substrate 120.

The electrode pair 130 comprises conducting materials such as silver or copper. When copper is used, a three-layer structure of Cr/Cu/Cr is employed to form electrode pair 130. The width and thickness of the electrode pair 130 is related to current intensity for gas discharging.

The dielectric layer 160 comprises $SiO_2$, $B_2O_3$, or PbO. In one embodiment, the dielectric layer 160 has a thickness of about 40 μm. The dielectric layer 160 is formed on the inner surface of the second substrate 120 covering the electrode pair 130 by printing, physical vapor deposition (PVD) or chemical vapor deposition (CVD).

The first fluorescent layer 170 disposed on the inner surface of the first substrate 110 comprises phosphor. Through the first fluorescent layer 170, the vacuum ultraviolet (VUV) is transformed into visible light, such as red light, green light, blue light or their mixture, to provide backlight for LCDs. In an alternative embodiment, a second fluorescent layer 180 is disposed on the inner surface of the second substrate 120 covering the dielectric layer 160. The second fluorescent layer increases the output intensity of the blink plasma backlight system 100.

Figure 2:
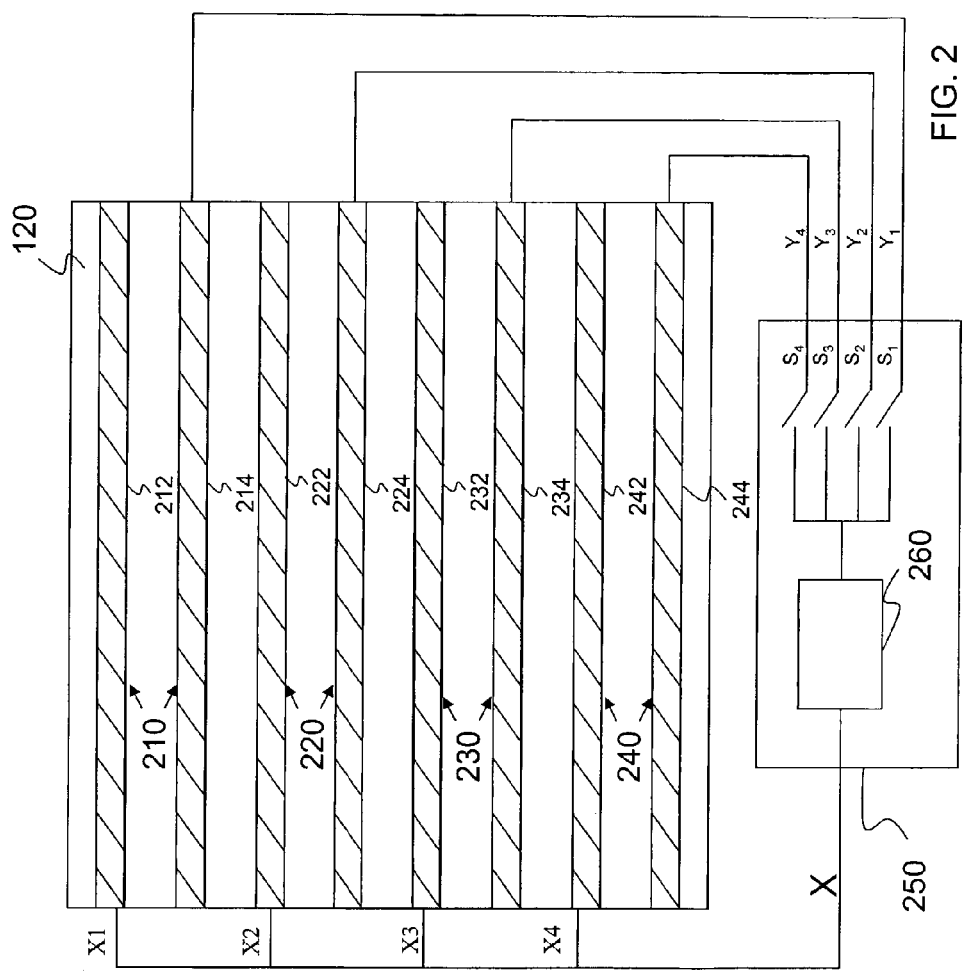
FIG. 2 illustrates a top view of a second substrate with four electrode pairs.

In another embodiment as shown in FIG. 2, four electrode pairs 210, 220, 230, and 240 are disposed on the inner surface of the second substrate 120 and coupled to the control unit 250. Four electrode pairs 210, 220, 230, and 240 are substantially parallel to each other. The first electrodes of four electrode pairs X1, 212; X2, 222; X3, 232; X4, 242 are connected together to the X end of the control unit 250. The second electrodes of four electrode pairs 214, 224, 234, 244 are respectively connected to Y1, Y2, Y3, and Y4 ends of the control unit 250.

Figure 3:
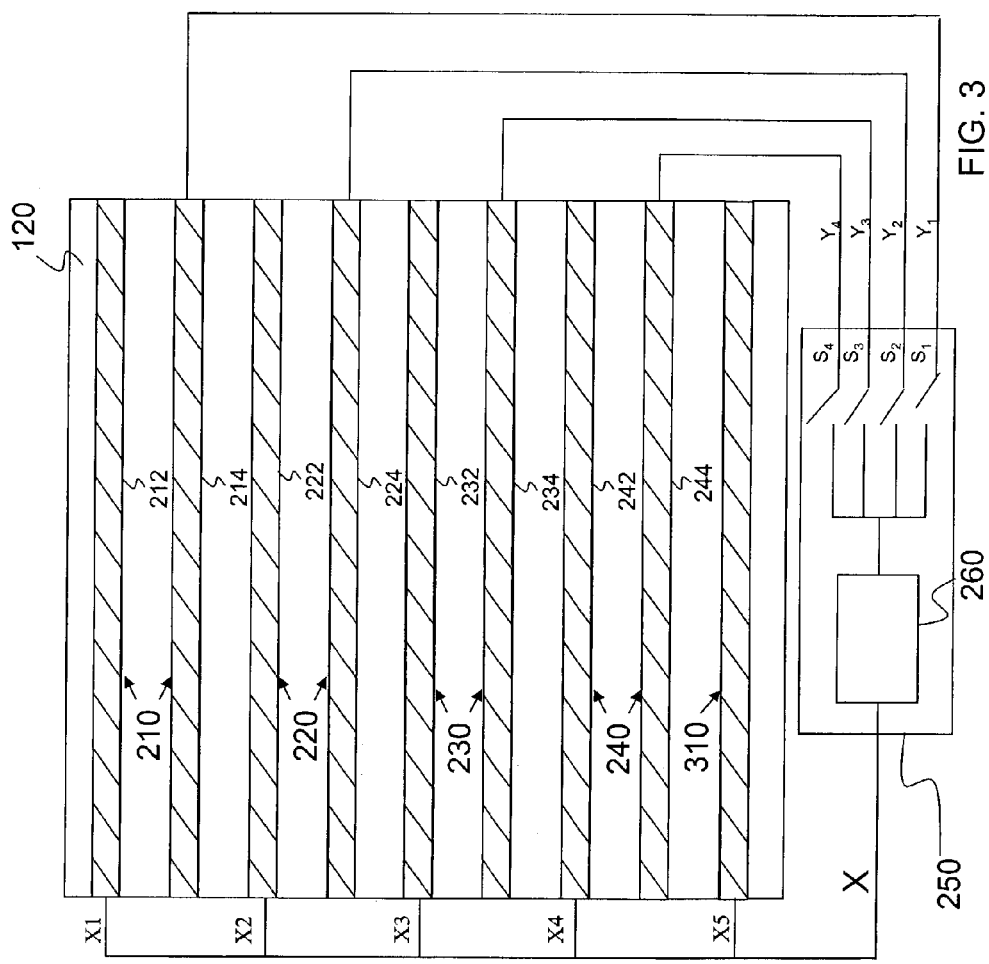
FIG. 3 illustrates the second substrate in FIG. 2 with one more electrode.

In FIG. 2, the control unit 250 comprises switches S1, S2, S3, and S4 respectively coupled to Y1, Y2, Y3, and Y4, and a sustain pulse generation circuit 260 to provide energy for gas discharge. Switches can be made of electronic devices. The X end of the control unit 250, including X1, X2, X3, and X4, is provided with sustain pulses. When the switch S1 is on, gases between X1 and X2 are discharged by the sustain pulses and result to light emission from the corresponding region. The region between electrodes X1 and X2 is a plasma blinking region. Likewise, when the switch S2 is on, gases between X2 and X3 are discharged. However, when the switch S4 is on, gases between X4 and Y4 are discharged. As a result, the width of plasma blinking region between X4 and Y4 while switch S4 is on may be narrower than that between X1 and X2 while switch S1 is on. An alternative embodiment as shown in FIG. 3 has one more electrode X5, 310. Thus, the width of plasma blinking region between X4, 242 and X5, 310 can be equal to that between X1, 212 and X2, 222.

A plasma blinking region, when corresponding electrodes are provided with sustain pulses to discharge gases, acts similar to a traditional CCFL tube. For a particular size of LCD, the blink plasma backlight system can accommodate more plasma blinking regions than CCFL tubes used in a traditional backlight system to reduce luminance loss due to blinking operation. In other words, the blink plasma backlight system can provide higher luminance than a traditional backlight system using CCFL tubes. Taking a 17-inch LCD as an example, a blink plasma backlight system can have 8 plasma blinking regions whereas a traditional backlight system has 2 CCFL tubes. In this embodiment, corresponding electrodes are elongated with length of about 36 cm, width of about 1 mm, and height of about 5 μm.

Figure 4:
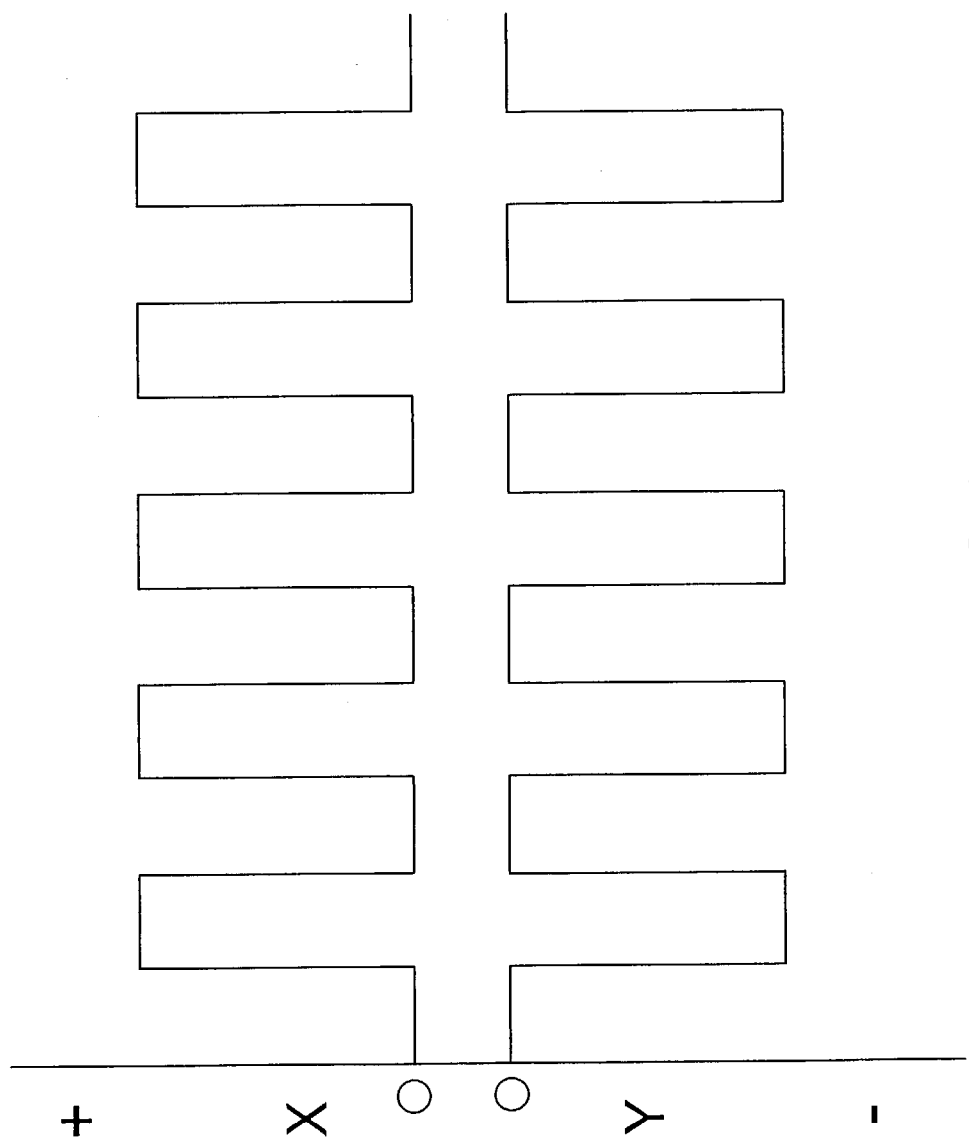
FIG. 4 illustrates an embodiment of a sustain pulse provided by a control unit to electrode pairs as shown in FIG. 2.

As shown in FIG. 4, to keep the plasma backlight output on, the sustain pulse 410 and 420 are used to repeatedly discharge gases. In this embodiment, the control unit 250 produces sustain pulses at about 1600 Volts with a frequency of about 200 kHz. The pulse duty cycle is 50% and the phase difference between the sustain pulse applied to first electrodes and second electrodes is 180 degrees. The voltage of sustain pulses, sustain voltage $V_s$, must be larger than the firing voltage $V_f$ in order to cause gas discharge. The firing voltage $V_f$ is related to the discharging gas used and the distance between the first electrode and the second electrode of an electrode pair. For example, the firing voltage $V_f$ is about 1600 Volts when xenon is used for discharging gas. The frequency depends on the desired peak luminance and power consumption limitation. The higher frequency results to a higher peak luminance.

In addition, gas discharge, which has a shorter response time than traditional CCFL tubes, also makes the blink plasma backlight system a better backlight supply for LCDs than traditional CCFL tubes. The Xenon atoms are excited and ionized by the sustain pulse. The vacuum ultraviolet (VUV) at wavelength such as 147 nm, 152 nm, and 173 nm is emitted when Xenon atoms and ions return from the excited states to stable states. In one embodiment, the response time of xenon gas discharge is less than about 5 μs.

Figure 5:
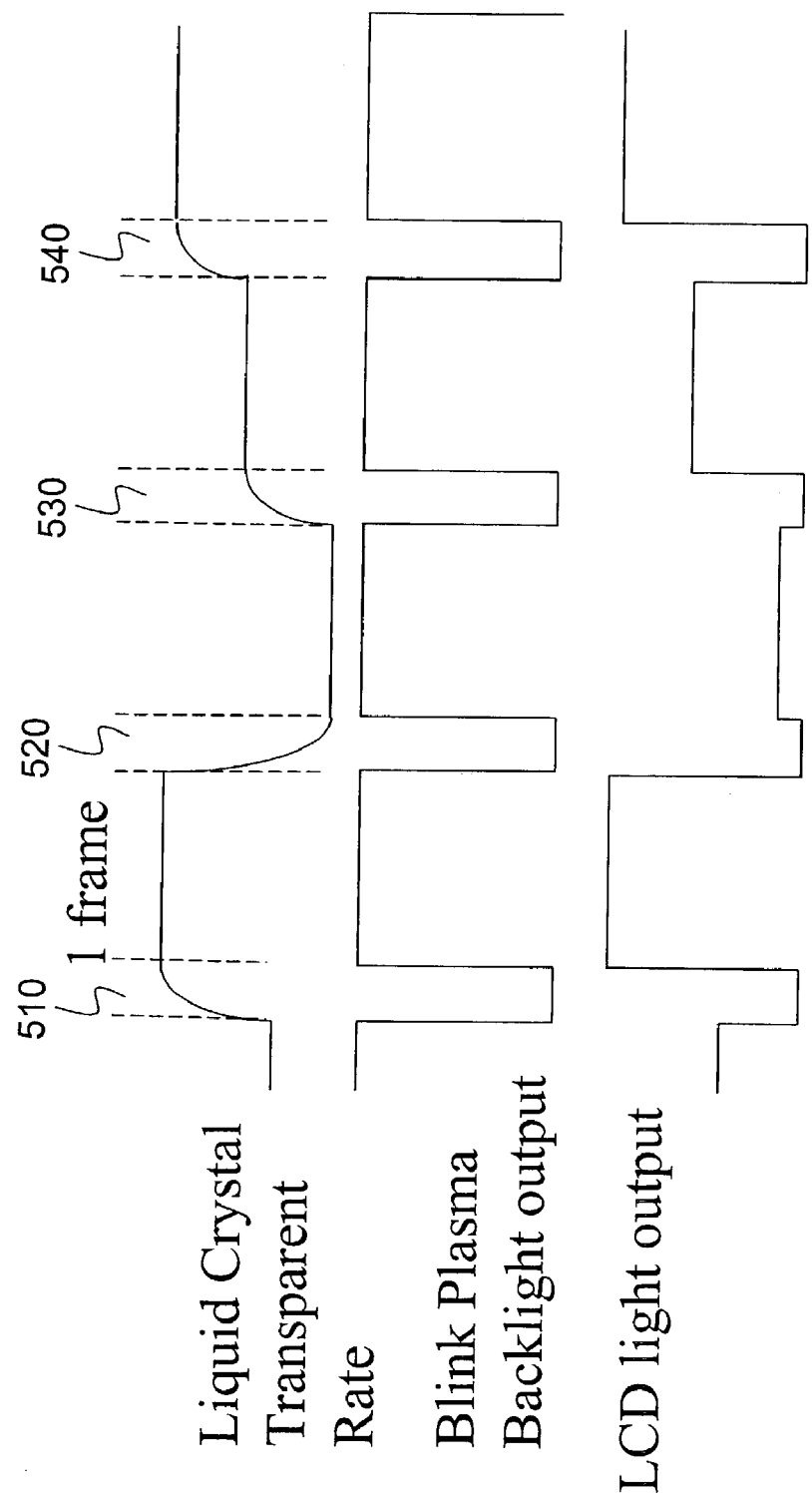
FIG. 5 illustrates the relationship between liquid crystal transparent rate, blink plasma backlight output, and LCD light output.
Figure 6:
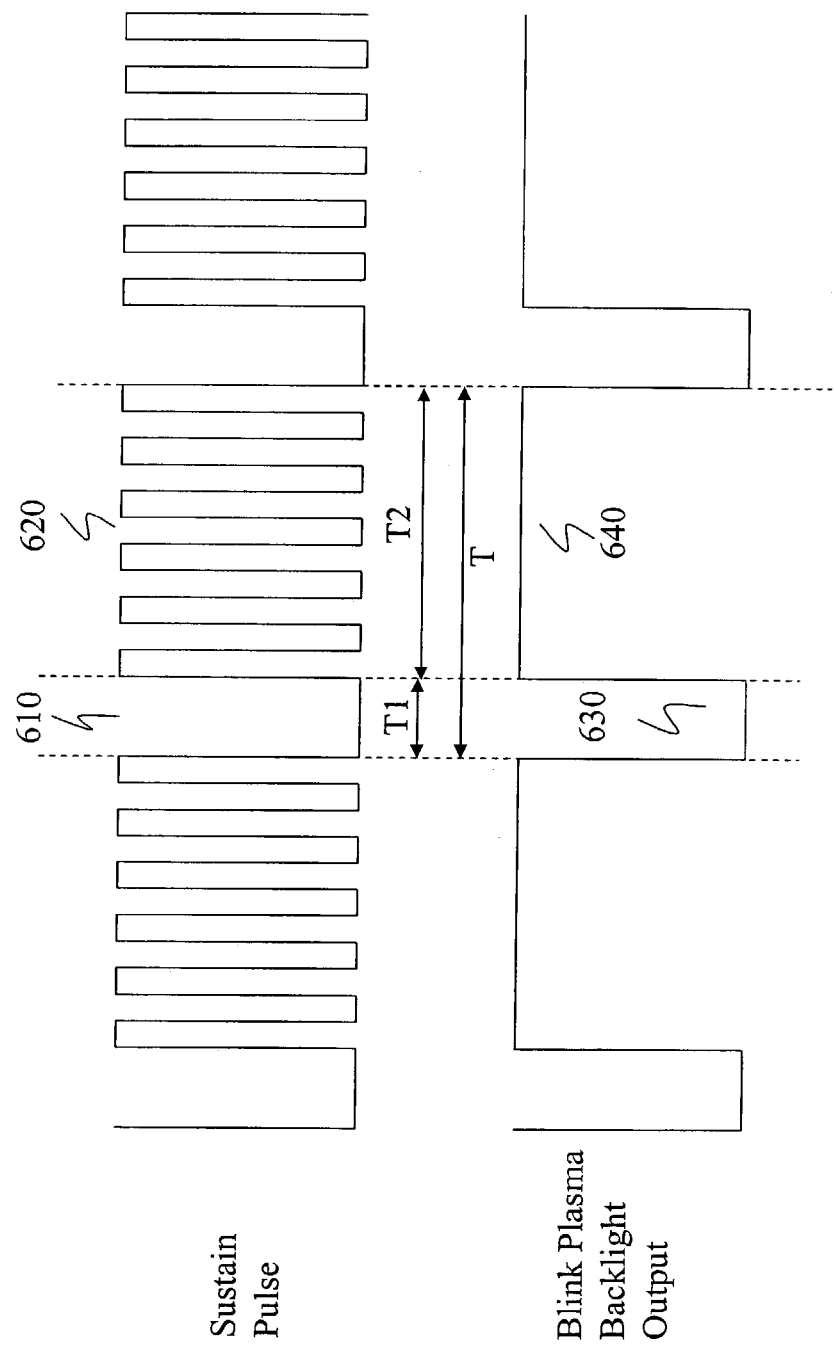
FIG. 6 illustrates the relationship between sustain pulses with periodical on and off, and blink plasma backlight output.

The plasma backlight blinking in an appropriate way related to response speed of liquid crystal can reduce the blurring phenomena of a moving picture. The blurring phenomena is caused by the residue image appeared while the corresponding portion of liquid crystal is in the transition phase, such as 510, 520, 530, and 540 of FIG. 5, and the backlight keeps striking and passing through the liquid crystal. Thus, the residue image is eliminated or reduced when the corresponding backlight is off during the transition period of time. As shown in FIG. 6, a frame T is about 16.6 ms, comprising an off period T1 and an on period T2. The sustain pulse is off 610 and the blink plasma backlight output is off 630 during the off period T1 where liquid crystal transforms from non-transparent to transparent status or from transparent to non-transparent status in response to the voltage changes. For the on period T2, the sustain pulse is on 620 and the blink plasma backlight output is on 640. The periodical on and off of the sustain pulse, therefore, cause a plasma backlight system to blink.

Figure 7:
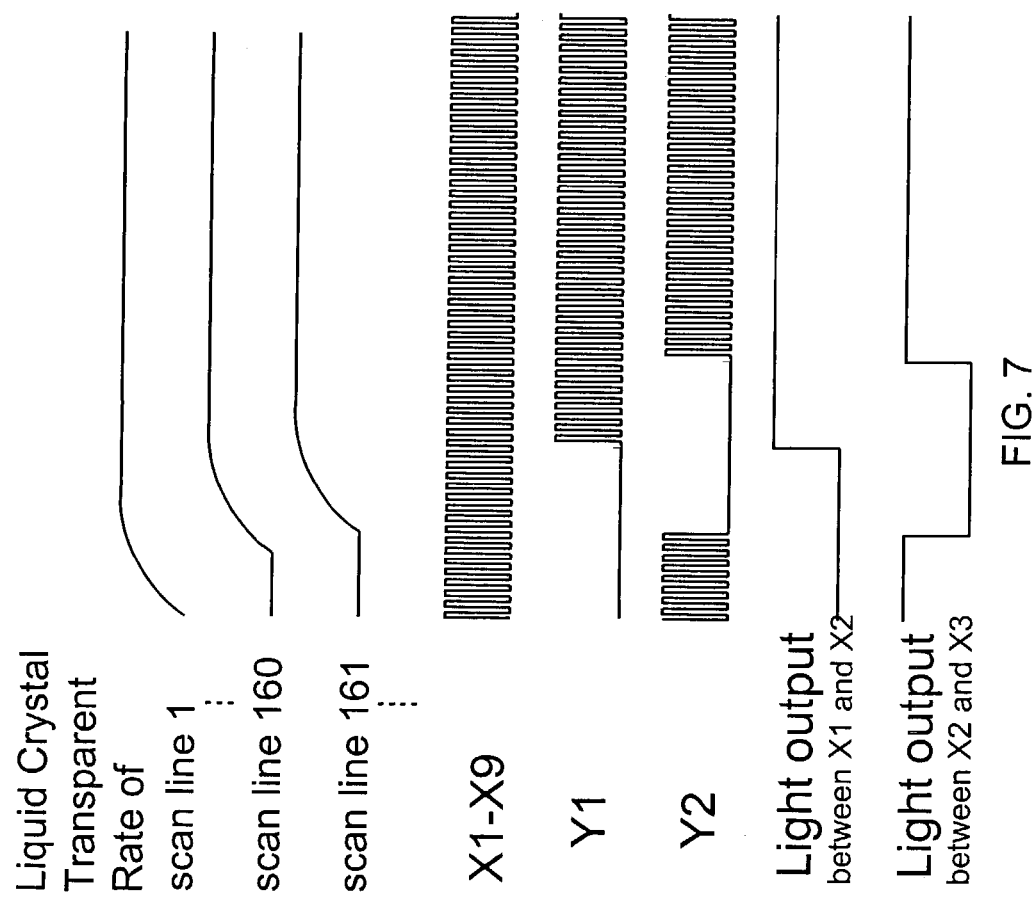
FIG. 7 illustrates the relationship between liquid crystal transparent rate, sustain pulses with periodical on and off, and blink plasma backlight output.

Taking a 17-inch liquid crystal display with 8 plasma blinking regions and a 1280×768 resolution as an example, each plasma blinking region corresponds to about 160 scan lines. As shown in FIG. 7, when scan line 1 to scan line 160 is addressed sequentially, liquid crystal in the region between scan line 1 and scan line 160 begins to transform from non-transparent status to transparent status or vice versa. During this period of time, the Y1 is off. As a result, the light output from corresponding plasma blinking region between X1 and X2 is off. Once liquid crystal transformation in the region between scan line 1 and scan line 160 is finished, the sustain pulse of Y1 is switched on and the light output between X1 and X2 is on. By the same token, when liquid crystal in the region between scan line 161 and scan line 320 are transforming from non-transparent status to transparent status or vice versa, the Y2 is off. Accordingly, the light output from corresponding plasma blinking region between X2 and X3 is off. Once liquid crystal transformation in the region between scan line 161 and scan line 320 is finished, the sustain pulse of Y2 is turned on and the light output between X2 and X3 is on. Because the backlight system blinks in a manner correlated to the transformation of liquid crystal, the blurring phenomena is reduced. Therefore, the quality of displaying a moving picture is improved.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A blink plasma backlight system for a liquid crystal display, comprising:
   a first substrate;
   a second substrate arranged substantially in parallel with and spaced-apart from said first substrate, forming a gas discharge space therebetween, the second substrate having an inner surface facing the first substrate;
   a plurality of electrode pairs disposed on the inner surface of said second substrate, each of said electrode pairs including a first electrode and a second electrode approximately parallel to each other;
   a control unit coupled to said electrode pair, the control unit periodically provides energy and ignite a gas discharge between said first and second electrodes, each second electrode communicates with the control unit independently through a separate switch from each of the other second electrodes.

2. The blink plasma backlight system of claim 1, further comprising one additional electrode disposed on said inner surface of said second substrate, said one additional electrode being substantially in parallel with said electrode pairs and being coupled to said control unit.

3. The blink plasma backlight system of claim 1, wherein said control unit provides energy in a form of a sustain pulse with voltage large enough to discharge said gas disposed between said first and second substrates.

4. The blink plasma backlight system of claim 3, wherein said sustain pulse has a voltage of approximately 1600 Volts when said gas disposed between said first and second substrates comprises xenon.

5. The blink plasma backlight system of claim 1, wherein said control unit provides said energy in a form of a sustain pulse with a phase difference of 180 degrees respectively to said first electrodes and said second electrodes.

6. The blink plasma backlight system of claim 1 for a liquid crystal display, wherein said control unit provides said energy in a form of a sustain pulse, which is off for at least a plasma blinking region corresponding to a portion of liquid crystals in said liquid crystal display during periods of time when said liquid crystals are in transition phase.

7. The blink plasma backlight system of claim 1, wherein at least one spacer is disposed between said first substrate and said second substrate to form said discharge space.

8. The blink plasma backlight system of claim 1, wherein said first and second substrates comprise glasses or plastic.

9. The blink plasma backlight system of claim 1, further comprising a first and a second fluorescent layers each facing the gas discharge space.

10. The blink plasma backlight system of claim 1, further comprising a dielectric layer disposed on said inner surface of said second substrate covering said electrode pairs.

11. The blink plasma backlight system of claim 10, further comprising a second fluorescent layer disposed on an inner surface of said second substrate covering said dielectric layer.

12. The blink plasma backlight system of claim 10, wherein said dielectric layer comprises $SiO_2$, $B_2O_3$, or $PbO$.

13. The blink plasma backlight system of claim 1, further comprising a first fluorescent layer disposed on said inner surface of said first substrate.

14. A blink plasma backlight system for a liquid crystal display, comprising:
   a first substrate;
   a second substrate arranged substantially in parallel with and spaced-apart from said first substrate, forming a gas discharge space therebetween;
   a plurality of electrode pairs and one additional electrode disposed on an inner surface of said second substrate, said electrode pairs having a first electrode and a second electrode;
   a control unit coupled to said electrode pair, said control unit periodically provides a sustain pulse to ignite a gas discharge between said first and second electrodes, said sustain pulse with voltage large enough to discharge said gas disposed between said first and second electrodes, said sustain pulse with a phase difference of 180 degrees for said first electrodes and said second electrode, said sustain pulse being off for at least a plasma blinking region corresponding to a portion of liquid crystals in said liquid crystal display during periods of time when said liquid crystals are in transition phase;
   wherein each second electrode independently communicates with the control unit through an independent switch.

15. The blink plasma backlight system of claim 14, further comprising a dielectric layer disposed on said inner surface of said second substrate covering said electrode pairs.

16. The blink plasma backlight system of claim 14, further comprising a first fluorescent layer disposed on said inner surface of said first substrate.

* * * * *